A. G. JETTE AND A. JOHNSON.
PRESSURE CONTROLLED FLOW DIRECTING MEANS FOR COMPOUND METERS.
APPLICATION FILED AUG. 1, 1918.
1,386,177.
Patented Aug. 2, 1921.
2 SHEETS—SHEET 1.
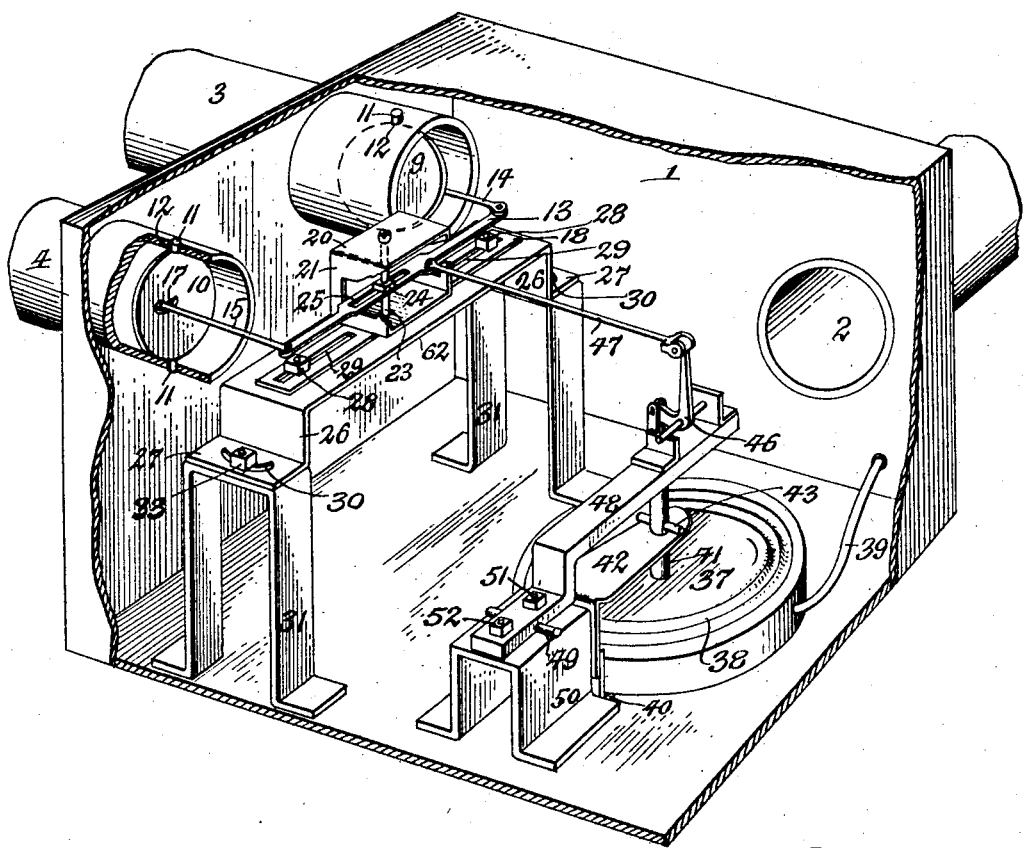
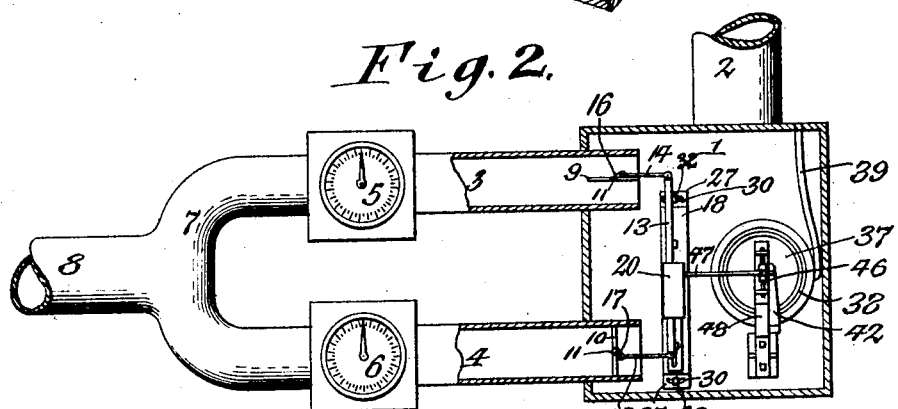

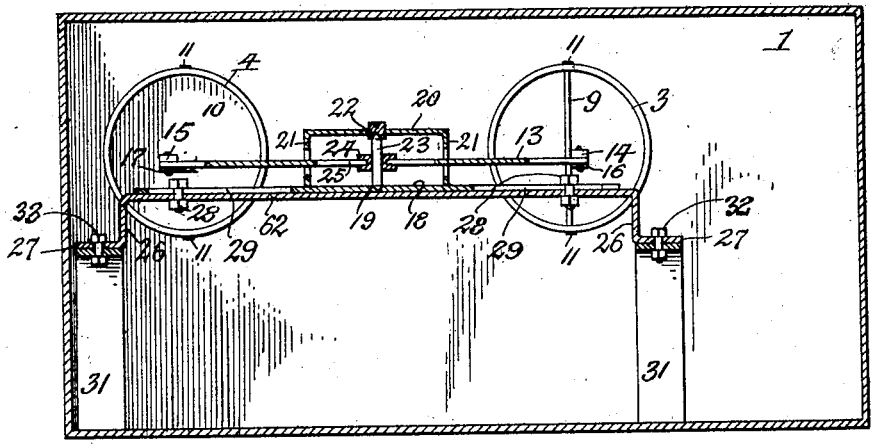
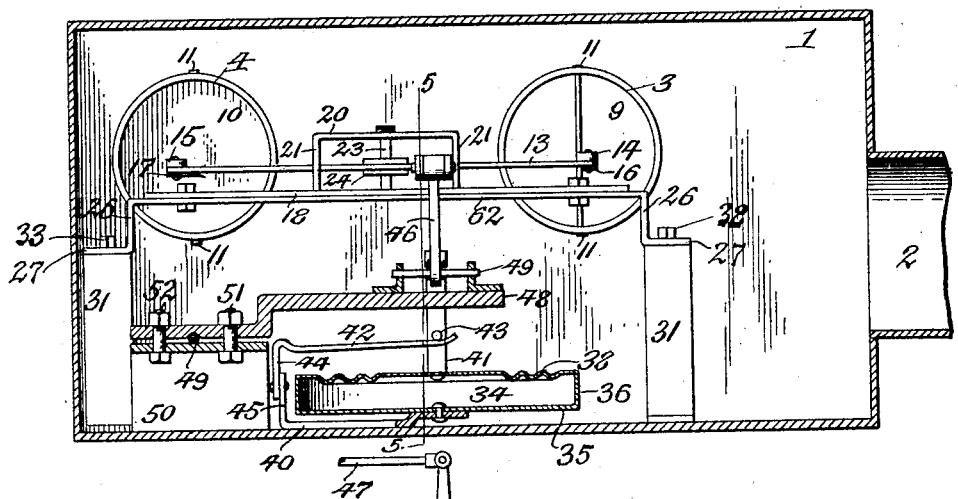

UNITED STATES PATENT OFFICE.

AUGUST G. JETTE AND AXEL JOHNSON, OF BUFFALO, NEW YORK.

PRESSURE-CONTROLLED FLOW-DIRECTING MEANS FOR COMPOUND METERS.

1,386,177.  Specification of Letters Patent.  Patented Aug. 2, 1921.

Application filed August 1, 1918. Serial No. 247,735.

*To all whom it may concern:*

Be it known that we, AUGUST G. JETTE and AXEL JOHNSON, subjects of the King of Sweden, residing at Buffalo, in the county of Erie and State of New York, have invented new and useful Improvements in Pressure-Controlled Flow-Directing Means for Compound Meters, of which the following is a specification.

It is known that combustible gas when supplied under a high pressure contains a larger amount of thermal units per cubic foot than when the same is supplied under a low pressure. Accordingly, when gas is supplied to consumers through a meter which only registers the volume of gas the purchaser for the same volume measured obtains a relatively smaller amount of heat units when the pressure is low than when the gas pressure is higher, consequently the consumer does not receive full value when making payment for goods in accordance with the indication of the meter-register. To obviate this discrepancy, ordinances have been passed governing the dispensing of combustible gases which provide that the gas must be supplied to the consumer at a pressure of approximately five to eight ounces, at which pressure the customer is supposed to obtain a gas containing the amount of heat units for which payment is made. It frequently happens, however, particularly during the winter time, that the gas pressure drops to atmospheric pressure at which time the flame is extinguished. When the gas pressure drops down to three ounces, for example, the power or other useful output of any gas consumer drops about fifty per cent. of the full value which would be obtained if the pressure were between five and eight ounces. When a consumer finds that the gas pressure is low, he usually opens up the valves wider which increases the speed of the flow and a greater volume of gas passes through the meter, so that a higher amount is registered and paid for without however obtaining a corresponding value in heat units.

It is the object of this invention to provide a plurality of meters with pressure controlled means by which the flow of gas thereto at pressures above normal will all be directed through one meter only, and below normal through the other meter only, while at normal pressure the flow will be divided, the parts going respectively through different meters.

In the accompanying drawings: Figure 1 is a perspective view, partly in section, showing one form of device embodying our invention. Fig. 2 is a top plan view of the same, partly in section. Figs. 3 and 4 are vertical cross sections. Fig. 5 is a fragmentary vertical section taken on line 5—5, Fig. 4.

Similar characters of reference indicate corresponding parts throughout the several views.

1 represents a pressure-chamber of any suitable construction which is provided with a gas inlet on conduit 2 whereby this chamber is connected with any suitable source of gas supply and two outlets or conduits 3, 4, which in this instance are constructed in the form of round pipes, one of these pipes, for instance the pipe 3, being adapted to deliver to a meter 5 which registers the gas when the pressure is high or above normal, while the other pipe 4 is adapted to deliver the gas to a meter 6 which registers the volume of gas passing through the same when the pressure is low or below normal. The outlets of both of these meters discharge by means of a manifold or coupling pipe 7 to a service or discharge pipe 8 whereby the registered gas is delivered to the place of consumption.

Within the pressure chamber means are arranged which are responsive to variations in the pressure of the gas which is supplied by the pipe 2, which means are associated with valves in the outlet pipes 3, 4, so as to control the passages therethrough and cause the gas when under high or above normal pressure to flow only through the high-pressure outlet pipe 3 and meter 5, and only through the low pressure outlet pipe 4 and meter 6 when the pressure is below normal, and to flow partly through both of these outlet pipes and meters when the pressure is normal or substantially so. In computing the value of the gas which has been supplied to the consumer through the discharge pipe 8 in accordance with this invention, it is only necessary to ascertain the ratio of the readings of both of these meters which have been determined according to the relative operation of the two valves and thus obtain a fair basis upon which the charge to the consumer may be made by the dispenser of the gas.

Although this valve mechanism and the means for controlling the same in response to the variations in the pressure in the supply may be variously constructed, those which are shown in the drawings are an example of a mechanism which is suitable for this purpose, and as there shown the same are constructed as follows:

9, 10 represent two valves which are arranged respectively in the high and low pressure outlet pipes, these valves being of the butterfly type and each being pivoted centrally by means of trunnions 11 on its diametrically opposite sides in suitable bearings 12 in the walls of the respective pipe so that the same can be rocked or turned and either extend across the respective outlet pipe and close the same, or be moved into a position in which the same is parallel or nearly so with the length of this pipe for opening the passage therethrough more or less.

13 represents an equalizing lever arranged within the pressure chamber and fulcrumed between its ends while its opposite arms are connected by links 14, 15 with cranks 16, 17 on the butterfly valves 9, 10 respectively, so that upon turning this equalizing lever in one direction the high pressure valve 9 will be closed and the low pressure valve 10 opened, and vice versa, while in an intermediate position of this lever both of these valves will be partly opened. For the purpose of nicely adjusting the operation of these valves so that they open and close at the proper time, and also maintain a proper distribution of the gas which passes through the same from the pressure chamber, means are provided for adjusting the fulcrum of the equalizing lever. For this purpose a fulcrum carrier or carriage is provided which preferably comprises a horizontal bottom-plate 18 provided with a lower bearing 19, and a horizontal top plate 20 connected by uprights 21 with the bottom plate and provided with an upper bearing 22 and an upright fulcrum pin or pintle 23 which is journaled at its upper and lower ends in the upper and lower bearings 22, 19 of the carrier and provided between its upper and lower ends with a slide 24 which moves in a longitudinal slot 25 formed in the equalizing lever between the ends thereof. Upon shifting this carrier in a direction lengthwise of the equalizing lever, the fulcrum of the same may be adjusted so that the length of its arms is varied and the movement of the high and low pressure valves so proportioned relatively to each other upon rocking the equalizing lever, that a proper distribution of the gases flowing from the pressure chamber to the high and low pressure meters is obtained. This fulcrum-carrier is held in its lengthwise adjusted position on a bracket which may be of any suitable construction but which as shown in the drawings preferably comprises an upper horizontal plate 62, upright legs 26 depending from opposite ends of this plate and horizontal feet 27 projecting outwardly from the lower ends of these legs. The longitudinally adjustable connection between the fulcrum carrier and this bracket is preferably effected by means of screws or bolts 28 passing through the top plate of this bracket and longitudinal slots 29 in the lower plate of the fulcrum carrier. By loosening the screws or bolts 28 the fulcrum carrier may be adjusted lengthwise of the equalizing lever and fulcrum bracket and after such adjustment has been effected the parts are held in position by tightening these screws. The throws of the high and low pressure valves may be further adjusted relatively to each other by moving the fulcrum of the equalizing lever in a direction parallel with the lines of movement of the links 14, 15 which connect the equalizing lever with the valves. This adjustment is preferably effected by providing opposite feet of the fulcrum bracket with curved slots 30 and securing these feet to the upper ends of standards 31 rising from the bottom of the pressure chamber by means of bolts or screws 32, 33 passing through the upper parts of these standards and the curved slots in the bracket feet. By loosening these screws or bolts 32, 33 the fulcrum-bracket may be swung on either of these screws as a fulcrum, or partly on both of the same, in a horizontal direction until the fulcrum pin 23 of the equalizing lever has been shifted into the proper position after which the fulcrum bracket may be held in place by tightening these bolts or screws.

The equalizing lever is rocked by means which are responsive to the pressure of the gas which is supplied by the pipe 2. These means are preferably arranged within the pressure chamber as shown, for example in the drawings, the same are constructed as follows:

34 represents an atmospheric chamber which comprises a horizontal bottom 35, an annular upright wall 36 rising from the bottom and a flexible diaphragm 37 connected with the upper end of the annular wall and capable of rising and falling relatively to this wall, which movement of this diaphragm is facilitated by providing the marginal part of the same with annular corrugations 38, as shown in Figs. 1 and 4. The interior of this atmospheric chamber is connected with the inner end of the atmospheric pipe 39 which latter connects at its outer end with the adjacent side wall of the pressure chamber so that the interior of the atmospheric chamber is in constant communication with the outer atmosphere. The bottom of the atmospheric chamber is connected centrally on its under side with a horizontal supporting bracket 40 which is secured to the bottom of the pressure chamber. Arranged above the diaphragm is a vertical-shifting rod 41 which is secured at its lower end to the central part of the diaphragm in any suitable manner so that these parts are compelled to move together vertically. When the gas enters the pressure chamber under pressure, the diaphragm is moved downwardly together with the parts connected therewith in opposition to the atmospheric pressure within the chamber 34, the extent of this downward movement depending upon the amount of pressure of gas within the pressure chamber. As the gas pressure within the pressure chamber is reduced, the atmosphere pressure within the chamber 34 tends to restore the diaphragm to its normal elevated position which tendency is assisted by a compensating spring having preferably the form of a leaf of spring metal which is bent into L-shaped form so as to provide a horizontal spring-arm 42 which is arranged over the diaphragm and engages its inner end underneath a shoulder or pin 43 on the shifting rod 41, and an outer supporting arm 44 projecting downwardly from the outer end of the horizontal arm 42 and connected with an upwardly-projecting lug 45 formed on the outer end of the supporting bracket 40, as best shown in Figs. 1 and 4. The motion of the diaphragm and shifting rod is transmitted to the equalizing lever by means which preferably comprise an intermediate shifting lever 46 preferably of bell-crank or L-shaped form, the lower horizontal arm of which is connected with the upper end of the shifting rod 41 while its upper vertical arm is connected by a link 47 with that arm of the equalizing lever which is connected with the high-pressure valve. It follows from this construction that when the diaphragm is moved downwardly to an abnormal extent by reason of the pressure of the gas within the pressure chamber being above normal, the high pressure valve will be opened and the low pressure valve will be closed, but when the pressure of the gas within the pressure chamber is below normal, the diaphragm will be raised by means of the spring arm 42, so that the high pressure valve will be closed and the low pressure valve opened, and both of these valves will be partly opened when the diaphragm occupies a position intermediate of its extreme upper and lower positions.

It is desirable to adjust the fulcrum of the intermediate lever so as to permit of adapting the same to the position of the diaphragm in which the same properly assumes either a normal position or positions above and below the normal, and for this purpose a vertically-adjustable rock arm 48 is provided which has its inner end arranged over the diaphragm and provided with bearings which receive the pivot pin of the intermediate lever while its outer end may be rocked upon a horizontal fulcrum 49 which is supported by the upper end of a standard or bracket 50 rising from the bottom of the pressure chamber, permitting of a rocking adjustment of the rock arm 40, by means of inner and outer bolts or screws 51, 52 connecting the upper end of this bracket or standard on opposite sides of the fulcrum 49 of the adjusting arm. By tightening one of these screws and loosening the other, the adjusting arm 48 may be raised or lowered so as to bring the pivot of the intermediate lever into proper position for accurately transmitting the motion of the diaphragm to the valves through the medium of the intermediate connecting mechanism.

It will be clear from the foregoing description of this device that when the pressure of gas in the pressure chamber is normal, both the high and low-pressure valves will be opened more or less so that gas will pass through both the high and low pressure meters before the same reaches the point of consumption, that when the gas pressure rises above normal, only the high pressure valve will be opened and registration of gas supplied to the consumer will be effected only on the high-pressure meter, and that when the pressure of the gas drops below normal only the low pressure valve will be opened so that registration of the gas which is delivered will be effected only on the low pressure meter. The registration of the meters therefore changes in harmony with the variations in the gas pressure and it is therefore possible by associating the readings of these two meters to determine the amount of thermal units contained in the gas which is supplied to the consumer and make the charge therefor accordingly.

This device is comparatively simple, the same can be produced at comparatively low cost, and it is not liable to get out of order, so that it is possible to accurately determine the value of the gas supplied to the consumer at all times.

We claim as our invention:

1. A pressure controlled flow - directing compound meter comprising a pressure chamber having a gas inlet and a plurality of outlets which are connected, respectively, with a plurality of indicators measuring total volumes of gas passing therethrough, and means which are responsive to the variations in pressure in said chamber and which operate to direct the gas from said chamber into one or another of said outlets.

2. A pressure controlled flow - directing compound meter comprising a pressure chamber, a gas supply conduit connected with said chamber, two gas outlet conduits connected with said chamber one of which is connected with a low pressure indicator and the other with a high pressure indicator, both of the indicators measuring total quantities of gas passing therethrough, valves arranged in said outlet conduits and means responsive to variations in gas pressure arranged in said chamber and operatively connected with said valves for closing the valve in the conduit leading to the high pressure indicator and opening the valve in the conduit leading to said low pressure indicator when the fluid pressure in said chamber drops, and vice versa.

3. A pressure controlled flow-directing compound meter comprising a pressure chamber, a gas supply pipe connected with said chamber, a high pressure outlet pipe connected with said chamber and with a high pressure indicator, a low pressure outlet pipe connected with said chamber and with a low pressure indicator, both of said indicators measuring total quantities of gas passing therethrough, valves arranged in said outlet pipes, a diaphragm arranged in said chamber and responsive to the pressure therein, and means for transmitting the movement of said diaphragm to said valves for opening one and closing the other.

4. A pressure controlled flow-directing compound meter comprising a pressure chamber, a gas supply pipe connected with said chamber, a high pressure outlet pipe connected with said chamber and with a high pressure indicator, a low pressure outlet pipe connected with said chamber and with a low pressure indicator, rocking valves arranged in said outlet pipes for controlling the passage therethrough, a diaphragm arranged in said chamber and responsive to variations in fluid pressure therein, and means for transmitting motion from said diaphragm to said valves for closing one and opening the other.

5. A pressure controlled flow-directing compound meter comprising a pressure chamber, a gas supply pipe connected with said chamber, a high pressure outlet pipe connected with said chamber and with a high pressure indicator, a low pressure outlet pipe connected with said chamber and with a low pressure indicator, rocking valves arranged in said outlet pipes for controlling the passage therethrough, a diaphragm arranged in said chamber and responsive to variations in fluid pressure therein, and means for transmitting motion from said diaphragm to said valves for closing one and opening the other comprising an equalizing rock lever connected with both of said valves, and an intermediate lever having one arm connected with said diaphragm and the other connected with said equalizing lever.

6. A pressure controlled flow-directing compound meter comprising a pressure chamber, a gas supply pipe connected with said chamber, a high pressure outlet pipe connected with said chamber and with a high pressure indicator, a low pressure outlet pipe connected with said chamber and with a low pressure indicator, rocking valves arranged in said outlet pipes for controlling the passage therethrough, a diaphragm arranged in said chamber and responsive to variations in fluid pressure therein, and means for transmitting motion from said diaphragm to said valves for closing one and opening the other comprising an equalizing lever pivoted between its ends and having its opposite ends connected with said valves, respectively, and an intermediate lever having one arm connected with said diaphragm and the other connected with one arm of said equalizing lever.

7. A pressure controlled flow-directing compound meter, comprising a pressure chamber, a gas supply pipe connected with said chamber, a high pressure outlet pipe connected with said chamber and with a high pressure indicator, a low pressure outlet pipe connected with said chamber and with a low pressure indicator, rocking valves arranged in said outlet pipes for controlling the passage therethrough, a diaphragm arranged in said chamber and responsive to variations in fluid pressure therein, and means for transmitting motion from said diaphragm to said valves for closing one and opening the other comprising an equalizing lever pivoted between its ends and having its opposite ends connected with said valves, respectively, an adjustable fulcrum for said equalizing lever, and an intermediate lever having one arm connected with said diaphragm and the other connected with one arm of said equalizing lever.

8. A pressure controlled flow-directing compound meter comprising a pressure chamber, a gas supply pipe connected with said chamber, a high pressure outlet pipe connected with said chamber and with a high pressure indicator, a low pressure outlet pipe connected with said chamber and with a low pressure indicator, rocking valves arranged in said outlet pipes for controlling the passage therethrough, a diaphragm arranged in said chamber and responsive to variations in fluid pressure therein, and means for transmitting motion from said diaphragm to said valves for closing one and opening the other comprising an equalizing lever pivoted between its ends and having its opposite ends connected with said valves, respectively, means for adjusting the fulcrum of said equalizing lever comprising a fulcrum pin slidable lengthwise of said equalizing lever, a carrier for said fulcrum pin adjustable lengthwise of said lever, and a bracket adjustable in a plane parallel with the plane of movement of said equalizing lever, and a support on which said bracket is mounted, and an intermediate lever having one arm connected with said diaphragm and the other connected with one arm of said equalizing lever.

9. A pressure controlled flow-directing compound meter comprising a pressure chamber, a gas supply pipe connected with said chamber, a high pressure outlet pipe connected with said chamber and with a high pressure indicator, a low pressure outlet pipe connected with said chamber and with a low pressure indicator, rocking valves arranged in said outlet pipes for controlling the passage therethrough, a diaphragm arranged in said chamber and responsive to variations in fluid pressure therein, and means for transmitting motion from said diaphragm to said valves for closing one and opening the other comprising an equalizing lever pivoted between its ends and having its opposite ends connected with said valves, respectively, an intermediate lever having one arm connected with said diaphragm and the other connected with one arm of said equalizing lever, and means for adjusting the fulcrum of said intermediate lever toward and from said diaphragm.

10. A pressure controlled flow-directing compound meter comprising a pressure chamber, a gas supply pipe connected with said chamber, a high pressure outlet pipe connected with said chamber and with a high pressure indicator, a low pressure outlet pipe connected with said chamber and with a low pressure indicator, rocking valves arranged on said outlet pipes for controlling the passage therethrough, a diaphragm arranged in said chamber and responsive to variations in fluid pressure therein, and means for transmitting motion from said diaphragm to said valves for closing one and opening the other comprising an equalizing lever pivoted between its ends and having its opposite ends connected with said valves, respectively, an intermediate lever having one arm connected with said diaphragm and the other connected with one arm of said equalizing lever and means for adjusting the fulcrum of said intermediate lever toward and from said diaphragm comprising a rock arm upon one end of which said intermediate lever is pivoted, a standard on which the other end of said rock arm turns and adjusting screws connecting said rock arm and standard on opposite sides of the fulcrum of said rock arm.

11. A pressure controlled flow-directing compound meter comprising a pressure chamber, a gas supply conduit connected with said chamber, two gas outlet conduits connected with said chamber one of which is connected with a low pressure indicator and the other with a high pressure indicator, valves arranged in said outlet conduits and means responsive to variations in gas pressure arranged in said chamber and operatively connected with said valves for closing the valve in the conduit leading to the high pressure indicator and opening the valve in the conduit leading to said low pressure indicator when the fluid pressure in said chamber drops, and vice versa, comprising an atmospheric chamber having its interior communicating with the outer atmosphere and having one of its walls constructed to form a diaphragm which is connected with said valves, and a spring operating constantly to move said diaphragm inwardly.

12. A pressure controlled flow-directing compound meter comprising a pressure chamber, a gas supply conduit connected with said chamber, two gas outlet conduits connected with said chamber one of which is connected with a low pressure indicator and the other with a high pressure indicator, valves arranged in said outlet conduits and means responsive to variations in gas pressure arranged in said chamber and operatively connected with said valves for closing the valve in the conduit leading to the high pressure indicator and opening the valve in the conduit leading to said low pressure indicator when the fluid pressure in said chamber drops, and vice versa comprising an atmosphere chamber having its interior communicating with the outer atmosphere and having one of its walls constructed to form a diaphragm which is connected with said valves, means for transmitting the movement of said diaphragm to said valves comprising a rod connected with said diaphragm, and a leaf spring engaging said rod and tending to move the same inwardly.

13. A pressure controlled flow-directing compound meter comprising a pressure chamber, a gas supply conduit connected with said chamber, two gas outlet conduits connected with said chamber one of which is connected with a low pressure indicator and the other with a high pressure indicator, valves arranged in said outlet conduits and means responsive to variations in gas pressure arranged in said chamber and operatively connected with said valves for closing the valve in the conduit leading to the high pressure indicator and opening the valve in the conduit leading to said low pressure indicator when the fluid pressure in said chamber drops, and vice versa comprising an atmospheric chamber having its interior communicating with the outer atmosphere and having one of its walls constructed to form a diaphragm which is connected with said valves, means for transmitting the movement of said diaphragm to said valves comprising a shifting rod connected with said diaphragm, a bracket having a lower part which supports said atmospheric chamber on its underside, and a leaf spring connecting the upper part of said shifting rod and tending normally to move the same inwardly.

14. An apparatus of the character described comprising a plurality of meters, means automatically controlled by the pressure of the fluid being metered whereby the flow to the meters at relatively high pressures will all be directed through one meter only, and at relatively low pressures through the other meter only, while the flow of fluid at pressures intermediate relatively high and low pressures will be divided the parts going respectively through different meters.

AUGUST G. JETTE.
AXEL JOHNSON.